United States Patent
Kao (10) Patent No.: US 6,239,505 B1
(45) Date of Patent: May 29, 2001

(54) HYDROPOWERED TURBINE SYSTEM

(75) Inventor: David T. Kao, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 09/213,338

(22) Filed: Dec. 17, 1998

(51) Int. Cl.$^7$ ............................. F03B 13/00; H02P 9/04
(52) U.S. Cl. ........................ 290/54; 290/42; 290/43; 290/52; 290/53
(58) Field of Search ........................ 290/43, 52, 54, 290/53, 42

(56) References Cited

U.S. PATENT DOCUMENTS

| | | | |
|---|---|---|---|
| 1,494,842 | 5/1924 | Huguenin | 290/52 |
| 1,504,776 | 8/1924 | Nagler | 290/52 |
| 1,673,605 | 6/1928 | Tappan et al. | 290/52 |
| 2,783,392 | 2/1957 | Corbiere | 290/52 |
| 2,949,540 | 8/1960 | Clayton | 290/40 |
| 4,130,399 | * 12/1978 | Amminger | 415/116 |
| 4,165,467 | * 8/1979 | Atencio | 290/52 |
| 4,311,410 | 1/1982 | Atencio | 405/78 |
| 4,367,890 | 1/1983 | Spirk | 290/52 |
| 4,441,029 | 4/1984 | Kao | 290/52 |
| 4,780,051 | * 10/1988 | Fisher, Jr. | 415/116 |
| 4,781,523 | * 11/1988 | Aylor | 415/2 A |
| 5,780,935 | 7/1998 | Kao | 290/52 |

* cited by examiner

*Primary Examiner*—Elvin Enad
(74) *Attorney, Agent, or Firm*—Zarley, McKee, Thomte, Voorhees & Sease (57) ABSTRACT

A hydropowered turbine system has a hollow base member with an inlet fluid conduit at its upper end in contact with retained water under pressure. A flared fluid outlet is located above the inlet fluid conduit. A buoyant needle valve is slidably mounted in the base member to open or close fluid flow through the fluid outlet. A turbine runner is mounted over the fluid outlet and includes a vertical shaft connected to a generator. A plurality of turbine blades are on the lower end of the shaft adjacent the fluid outlet. The upper edges of the blades are parabolic in shape and dwell in a parabolic plane. A flume ring surrounds and is connected to intermediate edges of the blades and is flared in shape to be compatible with the flared fluid outlet into which is extends. The blades with the flume ring are partially submerged in the tailrace of the system to enhance air entrainment of the discharged water and to simultaneously mix the discharged fluid.

7 Claims, 6 Drawing Sheets

HYDROPOWERED TURBINE SYSTEM

BACKGROUND OF THE INVENTION

Hydroelectric turbine systems have long been used as a source of electrical power. The efficiency of these devices has improved over the years, as illustrated in the devices of U.S. Pat. Nos. 4,441,029 and 5,780,935.

However, existing systems comprising valves and blade operated generator output shafts placed in a fluid flow still have certain shortcomings. Among the shortcomings are the inability to effectively aerate and recondition the water passing through the system wherein the liquid flow comes from a source deep behind a retaining dam where the water is short on oxygen among other deficiencies. More specifically they do not do an effective job of combined agitation and aeration of exit water. This is caused by incorrect positioning of the turbine runner relating to the tailrace, and improper use of all of the kinetic energy created by the system.

A further shortcoming of the hydropower turbine systems in the art is that the blades on the turbine runner are not easily and efficiently adjusted to meet different operating conditions. An additional shortcoming of the existing systems is that they include sharp or protruding surfaces which contribute greatly to fish mortality.

It is therefore a principal object of this invention to provide a hydropower turbine system wherein the turbine runner blades are partially submerged in the tailwater for achieving maximum aeration and turbulent mixing.

A further object of this invention is to provide a hydropowered turbine system wherein the turbine blades have upper arcuate edges which dwell in a parabolic plane, and intermediate edges surrounded by a flume ring for stability, and to prevent fluid loss.

A still further object of this invention is to provide a hydropowered turbine system wherein the water flows upward in the opposite direction of gravitational acceleration wherein equally spaced turbine blades have progressively outwardly flow passageways therebetween.

A still further object of this invention is to provide a hydropowered turbine system wherein the turbine blades have upper edges which dwell in a parabolic plane to provide a high theoretical kinetic energy recovery efficiency and wherein a component of the kinetic energy is useful in the aeration of the exiting liquid.

A still further object of this invention is to provide a buoyant needle valve flow control which can have its operating position efficiently controlled by means of a positive displacement pump.

A still further object of this invention is to have a hydropowered turbine system which can be easily serviced and maintained.

A still further object of this invention is to provide a hydropowered turbine system which is essentially free from sharp edges and protruberences and which will otherwise decrease fish mortality. This machine is specifically an improvement over the device of said U.S. Oat. No. 5,780,935.

These and other objects will be apparent to those skilled in the art.

SUMMARY OF THE INVENTION

The hydroelectric turbine of this invention has a base member with a fluid inlet and a fluid outlet. The fluid outlet is above the fluid inlet and is positioned to allow fluid exiting the base member to exit in an upward direction. A vertical rotor shaft has upper and lower ends and a vertical elongated axis. The rotor shaft is normally supported by the input shaft of an electrical generator. The lower end of the rotor shaft is positioned adjacent the fluid outlet of the base member. A plurality of equally spaced arcuate blades having upper edges are secured to the end of the shaft adjacent the fluid outlet and partially extend into the fluid outlet. The upper edges of the blades have a parabolic shape and dwell within a parabolic-shaped arcuate plane.

The blades have a wedge-shaped space therebetween which enlarges in an upwardly direction to create a progressively outwardly divergent flow passageway. The blades have an arcuate inner edge secured to the rotor shaft which extends in a helical direction with respect to the outer surface of the shaft. The blades are positioned with respect to the fluid outlet so that the direction of fluid flow upwardly from the base member will be perpendicular to the parabolic-shaped arcuate plane defined by the upper edges of the blades.

A flume ring is secured to intermediate edges of the blades and has a flared outersurface complementary in shape to a flared inner surface of the fluid outlet.

A needle valve assembly is slidably mounted for vertical movement within and interior compartment of the base and is adapted to be moved from a lower open position to a closed upper position with respect to the fluid inlet. Fluid conduits are provided to permit fluid to be introduced into and from the lower portion of the base member below the needle valve to adjust its position. A second fluid conduit is also used to connect the fluid inlet with the bottom portion of the base member to equalize the fluid pressure therebetween at times.

The method of use of the turbine includes submerging the turbine with respect to the tailwater surface of a retaining dam so that the blades will be partially submerged below the tailwater surface and partially extending thereabove wherein the blades will cause water droplets to be propelled upwardly and outwardly over the tailwater surface surrounding the fluid outlet while at the same time causing turbulent water mixing below the tailwater surface. The "turbulent mixing" action itself is designed to also aerate the water. The formation of air-born droplets (to increase air-water contact surface for effective aeration) and the subsequent re-entry (bringing with them air bubbles) and mixing of the droplets (as well as the air bubbles) into the water around the discharge outlet are designed to enhance the effectiveness of aeration induced by the turbulent mixing.

DESCRIPTION OF THE PREFERRED EMBODIMENT

Figure 4:
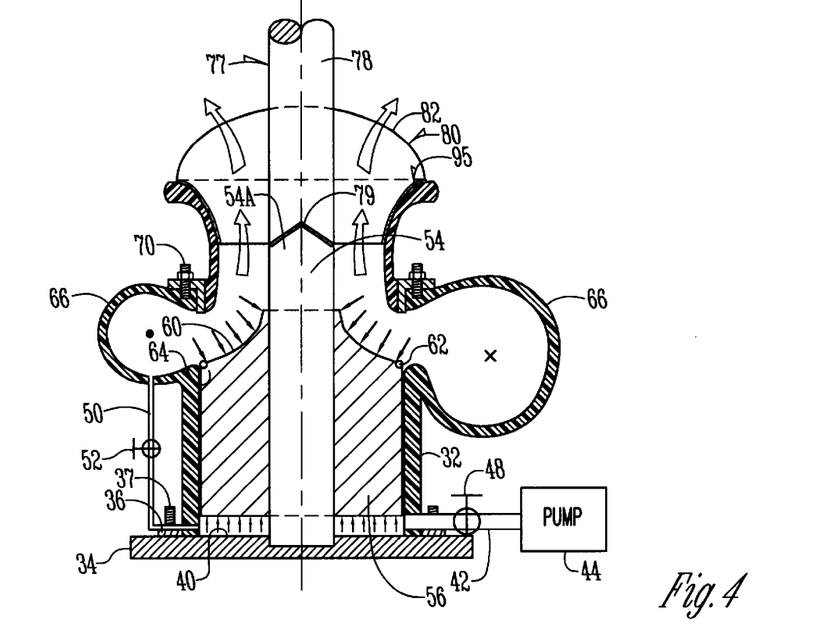
FIG. 4 is an enlarged longitudinal sectional view of the turbine of this invention as shown in FIG. 6 and showing the needle valve in its maximum open position.
Figure 5:
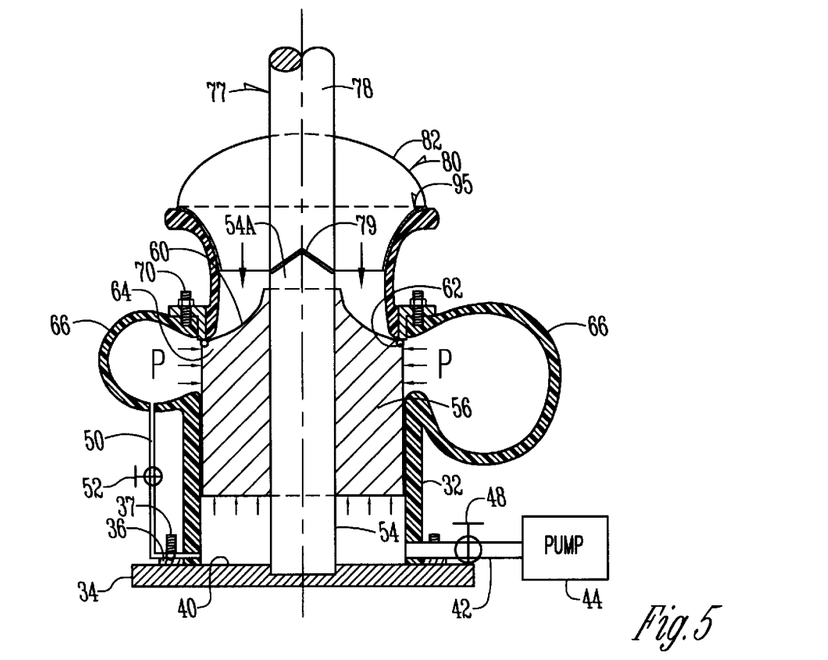
FIG. 5 is a sectional view of the turbine of this invention similar to that of FIG. 4 but showing the needle valve in its closed position.
Figure 6:
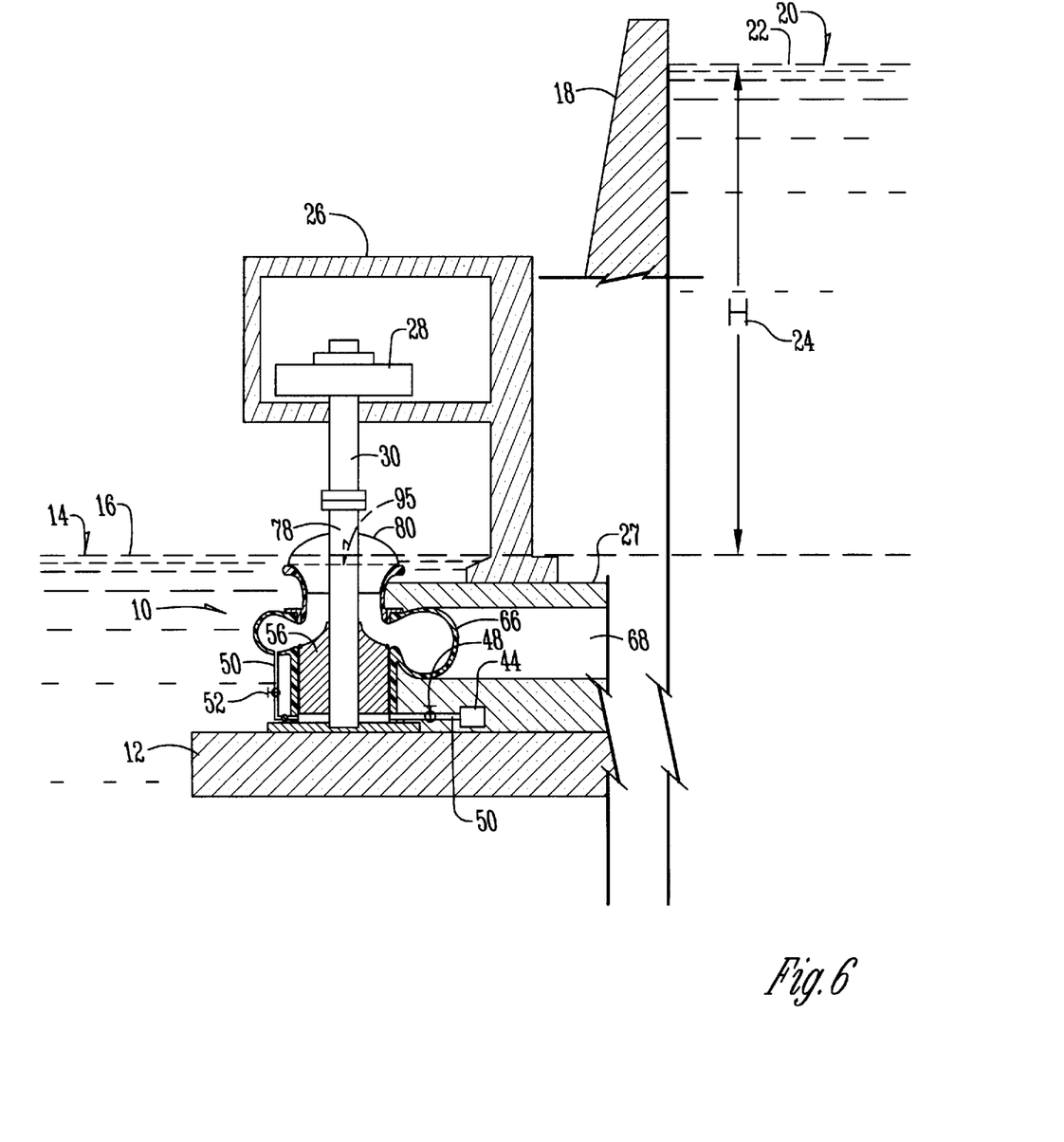
FIG. 6 is a reduced scale sectional view of the turbine of this invention mounted in the environment of a hydroelectric dam and being positioned in the tailwater of the dam.

The numeral 10 designates the hydroturbine of this invention and is shown primarily in FIGS. 1 through 6. With reference to FIG. 6, the hydroturbine 10 is supported on a foundation 12 in the tailwater 14 having a surface 16 which is located below a retaining dam 18. The conventional dam 18 typically retains water 20 having an elevated surface 22 with respect to the surface 16. The letter H, designated by the numeral 24 represents the head between surfaces 22 and 16.

A generator housing 26 is mounted on a foundation 27 and houses conventional electrical generator 28. Generator 28 has a vertically disposed generator input shaft 30.

Figure 1:
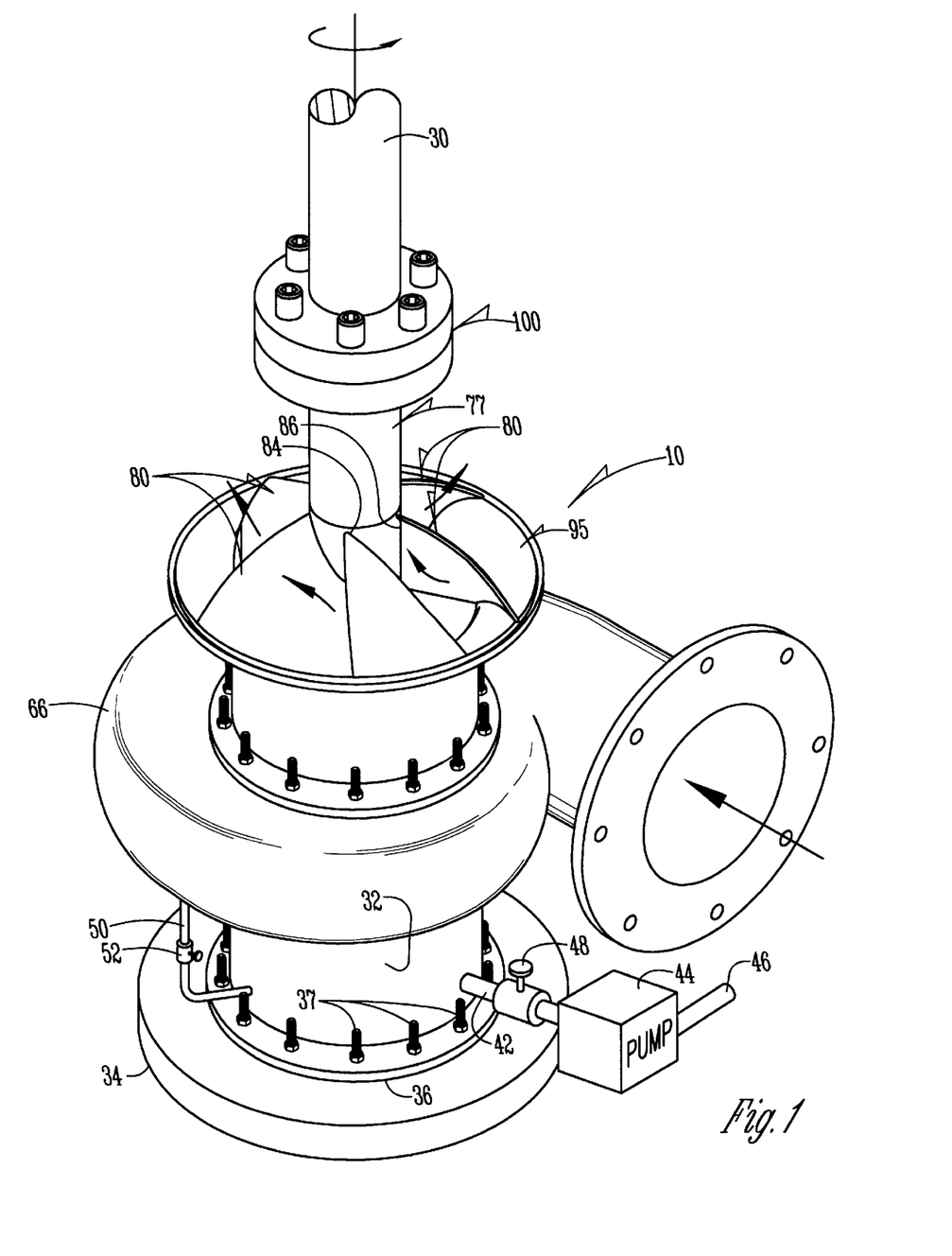
FIG. 1 is a perspective view of the hydropowered turbine of this invention.
Figure 2:
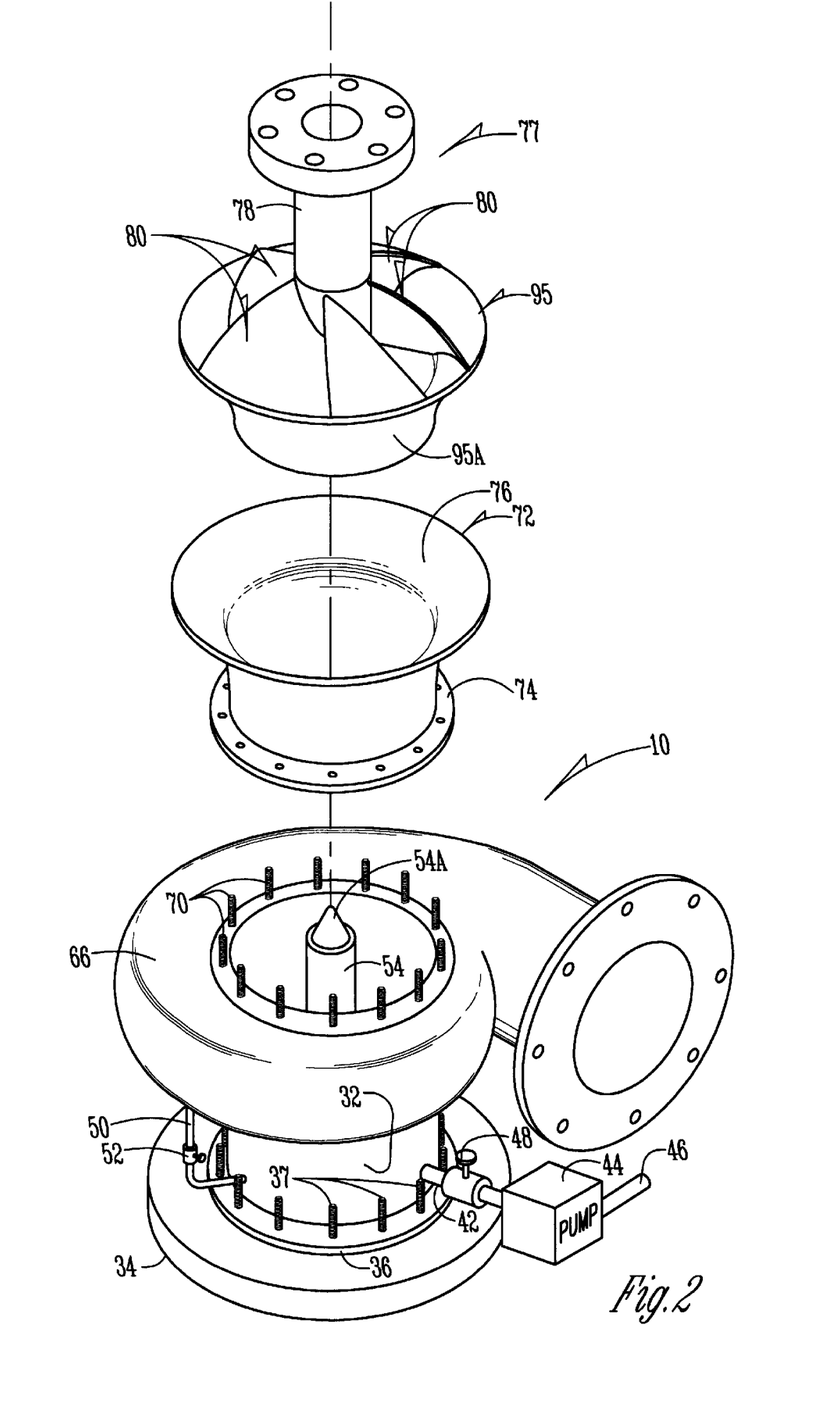
FIG. 2 is an exploded view at a smaller scale of the components of FIG. 1.
Figure 2A:
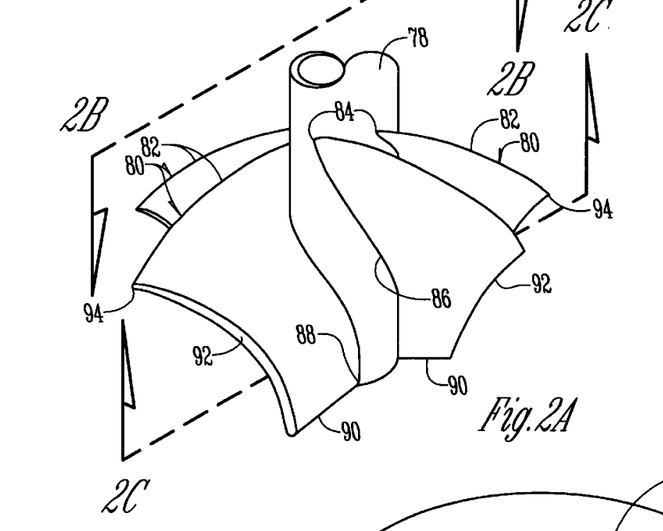
FIG. 2A is a large scale perspective view of the turbine blades mounted on the turbine runner.
Figure 3:
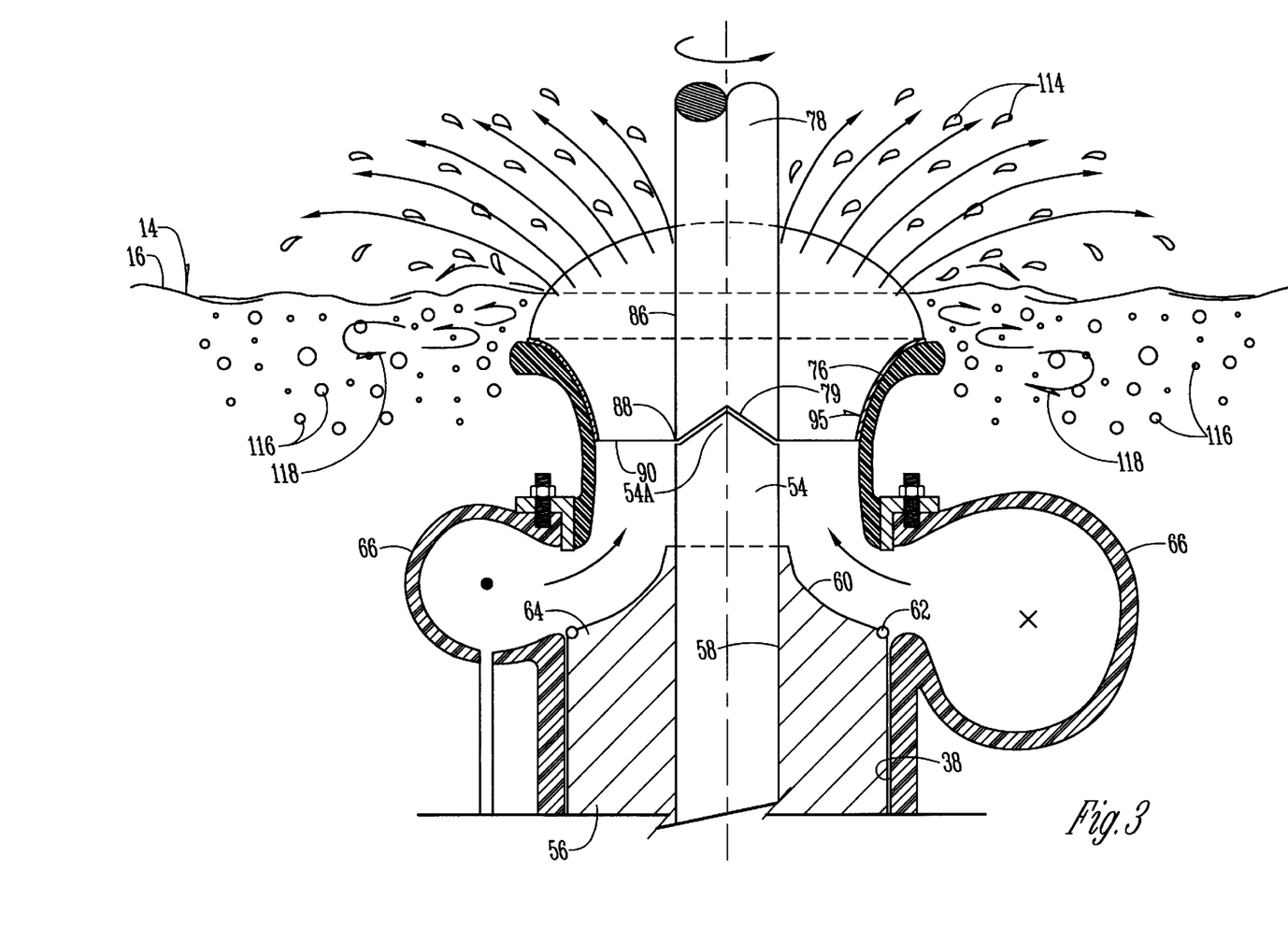
FIG. 3 is a partial sectional view of the upper portion of the turbine of this invention showing its partially submerged condition and showing it in operation.

Turbine 10 includes a cylindrical hollow base 32 which has a bottom 34 (FIGS. 2, 4 and 5). The base 32 has a lower horizontal flange 36 which is secured to bottom 34 by a plurality of conventional nut and bolt assemblies 37 (FIG. 1). The cylindrical base has an interior cylindrical compartment 38 (FIG. 3) which has a bottom end 40 (FIGS. 4 and 5). The lower end of cylindrical compartment 38 of base 32 is in communication with a fluid conduit 42 which is in communication with a reversible positive displacement pump 44, which is in turn connected by fluid conduit 46 to a source of fluid. The controls for pump 44 are conventional and the operation and direction of fluid flow from pump 44 can be manually or computer controlled. A valve 48 is imposed in conduit 42. Valve 48 can also be remotely controlled in a manner similar to that of pump 44.

A small capillary tube 50 with valve 52 imposed therein extends between the bottom end 40 of the cylindrical compartment 38 and the fluid inlet of the turbine as will be discussed hereafter. The valve 52 can be operated in the same manner as valve 48. The diameter of tube 50 would typically in the order of ⅜th's inch, as compared to the diameter of conduit 48 which would be in the order of ¾'s inch to one inch.

A needle valve shaft 54 is disposed in a vertical position and is located in the center of bottom 34 of base 32. A needle valve 56 is slidably mounted on shaft 54 by means of vertical bore 58 which extends through the needle valve 56. The top portion 60 of valve 56 is concave in shape and has a circular seal ring 62 extending around shoulder 64 which is the intersection of the concave portion 60 and the sidewalls of the valve 56.

A circular inlet conduit 66 is integral with the cylindrical base 32 as best shown in FIGS. 3, 4 and 5. The conduit 66 is in communication with the cylindrical compartment 38 and is connected with fluid inlet conduit 68 which in turn is in communication with the retained water 20 at the bottom of dam 18 (FIG. 6).

With reference to FIGS. 2 and 3, upstanding bolts 70 are imbedded in the upper portion of inlet conduit 66 to receive the outlet flume 72 through suitable apertures in the lower flange 74 connected to the lower perimeter of flume 72. The upper portion of the flume 72 is flared outwardly at 76 and comprises the fluid exit portion of the turbine. FIG. 4 shows the needle valve in its open position and FIG. 5 shows the needle valve in its closed position. The needle valve is moved from the position in FIG. 4 to the position in FIG. 5 by first closing the valve 52 in capillary tube 50, and then opening the valve 48 in conduit 42. The pump 44 is energized to bring fluid under pressure into the bottom of cylindrical compartment 38 thus causing the needle valve 54 to slidably rise in the compartment 38 on needle valve shaft 54. The needle valve 56 can be raised to any degree desired up to the maximum closed position shown in FIG. 5. When the needle valve is moved to its desired position, the valve 48 is closed, and the valve 52 is opened so as to balance the hydraulic pressure in the conduit 66 and the lower end of the compartment 38. The needle valve 56 is moved from the closed position of FIG. 5 to an open position of FIG. 4 by reversing the above described procedures whereupon the valve 52 in capillary tube 50 is closed, the valve 48 in conduit 42 is opened, pump 54 is reversed so as to withdraw fluid from the bottom of compartment 38. When the needle valve is lowered to its desired position, the operation of the pump is stopped, the valve 48 is closed, and the valve 52 is opened.

With reference to FIGS. 1 through 6, a turbine runner 77 has a vertically disposed turbine output shaft 78 with a plurality of turbine blades 80 welded or otherwise secured thereto. As shown in FIG. 5, the lower end of shaft 78 has a conically shaped depression 79 which receives a conically shaped protrusion 54A on the upper end of needle valve shaft 54.

Turbine blades 80 (FIG. 2A) have upper edges 82 that are in the shape of a parabola and which all dwell in a parabolic-shaped plane. The numeral 84 designates the upper ends of the blades. Extending downwardly in a helical path from the upper ends 84 of the blades is an inner edge 86 which has a lower end 88. The inner edges of the blades extend in a helical path along the outer surface of the shaft 78. The blades have a bottom edge 90 which extends outwardly in a horizontal direction from the lower ends 88 of the inner edges 86 of the blades. An intermediate edge 92 on each blade extends upwardly and outwardly from the outer end 90 of the blades to conform to the flared surface 76 (FIG. 2) of the outlet flume 72. The numeral 94 designates the lower end of the upper edge 82 of the blades.

A flame ring 95 (FIG. 2D) is secured in any convenient fashion to the intermediate edges 92 of the turbine blades 80. The ring 95 has a flared surface 95A which is compatible in shape to the flared surface of 76 of outlet flame 72. Ring 95 has a center opening 95B. Ring 95 reinforces the blades 80 and reduces possible water leakage. The ring 95 has a "depth" substantially equal to the length of edges 92 of the blades 80.

Figure 2B:
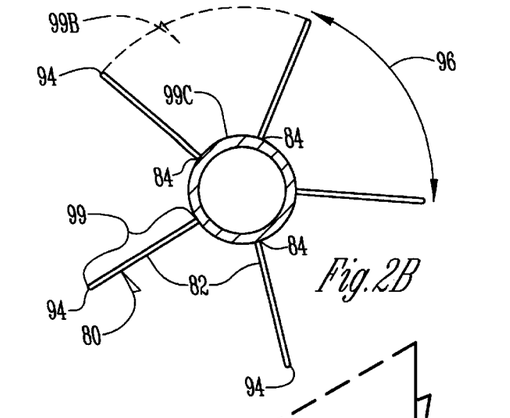
FIG. 2B is a sectional view of the turbine runner taken on line 2B—2B of FIG. 2A, and shows the upper edges of the turbine blades.
Figure 2C:
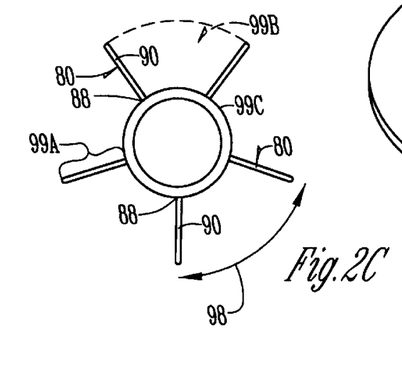
FIG. 2C is a bottom view of the turbine runner taken on line 2C—2C of FIG. 2A and shows the bottom edges of the turbine blades.
Figure 2D:
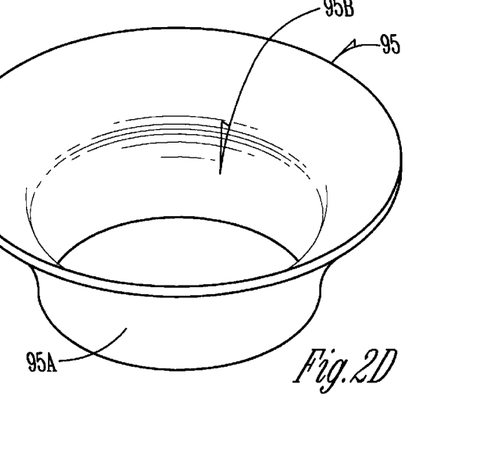
FIG. 2D is a perspective view of a flume ring which is, in the assembled unit, secured to the turbine blades.

With reference to FIG. 2B, the arrow 96 designates the radially varied circumferential distance between the upper end 84 of blade 80 and the upper end 84 of the next adjacent blade 80. Similarly, the arrow 98 (FIG. 2C) designates the radially varied circumferential distance between the lower end 88 of blade 80 and the lower end 88 of the next adjacent blade 80. The distance represented by arrow 98 is less than the distance designated by arrow 96 so that the volume of space between adjacent blades progressively is increased from the bottom end to the top end of the blades because the radial length 99 (FIG. 2B) of the upper edges 82 is greater than the radial length 99A (FIG. 2C) of bottom edges 90.

A wedge-shaped space 99B (FIGS. 2B, 2C) exists between adjacent blades 80 and is defined by the parabolic plane encompassing upper edges 82, the surface area of the blades, a horizontal plane passing through the bottom edges 90 and the exposed surface 99C (FIGS. 2B and 2C) of shaft 78 between the helical inner edges 86. Thus, a progressively upwardly and outwardly divergent flow passageway is formed from the bottom to the top of space 99B.

A conventional coupling 100 is used to join the lower end of generator input shaft 30 and the upper end of turbine outlet shaft 78 (FIG. 1).

THEORY AND OPERATION OF THE INVENTION

One of the principal environmental issues directly related to hydropower generation is its impact on downstream water quality. Impoundment of water can cause considerable alteration of water quality characteristics from the quality regime of the natural stream. The most significant water quality alteration results from the temperature and dissolved oxygen stratification that takes place in the reservoir. The negative impact on downstream water quality becomes more predominant when the water for the hydropower generation is taken, as is frequently the case, from the hypolimnion depth in the reservoir where dissolved oxygen is very low or completely absent (e.g. below a depth of 30 feet). Depending upon the local conditions, water at this depth can also contain very high amounts of dissolved nitrogen. The conventional hydropower turbine system permits the water to pass through a closed conduit to discharge under submerged flow condition from the intake through the tailrace into the downstream channel. This severely limits the aeration and saturated gas stripping potential of the discharge water.

In the turbine 10, water flows upwardly through the turbine runner and exits freely into the atmosphere near the water surface 16 in the tailrace 14. This fundamental change in design enhances the natural aeration process, air entrainment, and turbulent mixing for both absorption to increase dissolved oxygen and desorption to strip away the over-saturated gas such as nitrogen and helps improve water quality in the downstream channel.

In order to achieve the optimum result for air bubble entrainment and air-water mixing, the turbine blades 80 need to be partially submerged under water surface 16 and partially exposed to the atmosphere as shown in FIG. 3. The exposed portion of the turbine runner 77 and blades 80 allows water to spread directly into atmosphere forming water drops 114 (FIG. 3) to increase the air-water contact surface. As these water drops re-enter, they bring air bubbles 116 (FIG. 3) into the tailwater 14 augmenting air entrainment. The submerged part of the turbine blades will use the blade motion, as well as residual kinetic energy to create turbulent mixing action. (See arrows 118 in FIG. 3). This will further increase air-water contact and enhance absorption and desorption processes.

Because the fluid flow through turbine 10 is in an upward direction, it is possible to achieve certain advantages. Among these are the ability to minimize residual kinetic energy loss in the discharge water and to improve overall hydropower plant efficiency. For the similar partial kinetic energy recovery, the conventional system relies on a long and costly draft tube. This invention permits the recovery of a portion of the residual exit flow kinetic energy. In designing a runner-diffuser, the fundamental consideration is to prevent potential flow separation from the surface of the runner blade. The fluid dynamic theories one can use to guide the diffuser design include the theory of boundary layer separation and energy conservation principle of flow through gravitation field.

The boundary layer separation theory can be simply stated as follows:

A point of flow separation is reached when the velocity gradient in the direction normal to the direction of flow within the boundary layer (y=0) vanishes.

$$\left(\frac{\partial v_x}{\partial y}\right)_0 = 0$$

where vx=velocity component in x-direction which is in the normal (perpendicular) direction of y.

By applying this theory to flow in a horizontal conduit system the angle of boundary divergence is limited to normally not exceeding 7 to 9 degrees in the direction of the flow. This angle is even more restricted in a system with downward flow. This helps to explain why a conventional downward or horizontal flow hydropower generation system must use a very long draft tube in order to recover any significant amount of kinetic energy from the turbine discharge flow. Since the fluid flow through turbine 10 is upwardly, the fundamental principle of energy conservation can be used to prevent flow separation. Thus, while energy contained in a fluid flow system may exist in a combination of different forms namely: potential energy, kinetic energy, and/or elastic (pressure) energy, and may convert in full or in part from one form or another due to changing flow conditions, its total amount remains the same.

$$\left[\rho g Z + \frac{\rho V^2}{2} + P\right] = K$$

where $\rho$ = mass density of water;

$g$ = gravitational acceleration constant;

$Z$ = elevation;

$V$ = flow velocity;

$P$ = pressure; and $K$ = constant

As the flowing water passes through a well engineered reaction turbine runner, the pressure head contained in the flow is totally converted to work done on the turbine-generator unit. By applying this principle one can determine the magnitude of velocity reduction as a function of the elevation increase (conversion of kinetic energy to potential energy) or vice versa as water flow upward through the turbine runner using the following relationship:

[velocity]$^2$ reduction=[2×gravitational acceleration×elevation increase]

$\Delta(V)^2$=(−) 2g$\Delta$Z

V=flow velocity;

g=gravitational acceleration constant; and

Z=elevation

This equation can be used in the design of the divergent flow passage way formed by the adjacent turbine runner blades 80. This relationship is uniquely applicable for the updraft flow through a reaction turbine with a near free surface discharge flow arrangement as presented in turbine 10. It does not apply to turbine flow systems operating under closed conduit flow conditions through a restricted cross sectional area like those used in conventional hydropower generation systems.

In the actual design process of the turbine runner 77 one can estimate the maximum permissible exit flow area based on the mass conservation principle. This principle is commonly expressed in terms of equation of continuity which is written for velocity component normal to the flow area under concern and takes the form of $$[\text{Velocity} \times \text{Area}]_{@section-i} = [\text{Velocity} \times \text{Area}]_{@section-e} [V_n{}^*A]_i = [V_n{}^*A]_e$$

where $V_n$=velocity component normal to flow area A.

The product of velocity and area at inflow section-i is determined by the flow condition of the hydropower plant site. The velocity at the exit section-e is computed using the energy conservation principle described above. The only remaining unknown parameter, area at the exit section-e, can then be readily determined. The computed area gives the limiting value for the exit flow cross sectional area. Selection of a smaller exit flow area than the computed value will, in most cases, automatically satisfy the boundary layer separation theory, as well as the flow through gravitational field. Once the exit flow velocity is known, the kinetic energy recovery efficiency can be determined.

By comparing blades that are circular in shape, with the parabolic-shaped edges 82 on blades 80, it has been determined that the blades 80, whose edges 82 dwell in a parabolic-shaped plane, yield a higher discharge water velocity especially along the center portion of the exit flow area and gives potentially more effective water spread. Furthermore, a parabolic-dome does not rise as high above the tail water elevation at the middle portion of the turbine and therefore does not sacrifice as much effective head as in the spherical dome case.

The hemispherical dome which provides larger exit flow area, thus, a smaller discharge water velocity, can achieve a theoretical kinetic energy recovery efficiency of $[\{1-(1/21.73)\} \times 100 = 95.4\%]$. This is higher than the conventional draft tube kinetic energy recovery efficiency which is normally designed for approximately at $[\{1-(1/16)\} \times 100 = 94\%]$. On the other hand, the parabolic-dome design of blades 80 gives a theoretical kinetic energy recovery efficiency of $[\{1-(1/8.65)\} \times 100 = 89.4\%]$ for a similar turbine size and dimensions. This means that the latter design leaves more residual velocity to work for aeration and turbulent mixing to improve downstream water quality.

A needle valve is known for providing high operating efficiency over a broad range of flow conditions. In turbine 10, the needle valve 56 is designed to operate in the vertical position as an integral part of the uniform radial inflow distribution system. By connecting the lower portion of compartment 38 below the needle valve 56 through the small pressure transmission tube 50 to the turbine flow system itself, the needle valve 56 can be balanced to be near neutually buoyant. This allows the operation of the needle valve 56 to take place by using hydraulic means with very little external power. The hydraulic fluid (water can be used) needed for operating the needle valve 56 is supplied through conduits 42 and 46 and positive displacement pump 44 as described above.

During the needle valve opening operation, the water pressure in the lower chamber beneath the needle drum can be partially released by means of the small reversible positive displacement pump 44 through tube 46. This will create a partial vacuum inside the lower portion of compartment 38 to allow the atmospheric pressure exerted on the upper part of the needle valve 56 to push the valve downwardly to an open position. This further ensures easy operation of the needle valve with a minimum of external power supply.

Conventional hydropower generation lets the high-pressure water flow to enter the turbine-generator unit around the power transmission shaft between the turbine and the generator. This type of arrangement requires the use of a high-pressure seal around the rotating shaft to prevent water leakage into the generator housing and to periodically re-pack the "stuffing box" containing the sealing material. Depending upon the specific method adopted in its design, such periodical maintenance operations can be frequent and difficult and cause undesirable power generation outages. Because of the use of a vertical upward flow and the free surface exit water discharge arrangement of turbine 10, the generator shaft 30 is placed at the downstream (low energy) side of the turbine runner 77 and above the normal tailwater surface 16. This new design provides several distinct advantages. It eliminates the potential of high pressure water seeping along the rotating power transmission shaft into the generator housing. It provides easier accessibility for system installation and maintenance. It increases the flexibility for modular system construction.

By allowing free surface water discharge without a draft tube, the new hydropower turbine system herein does not have flow cavitation. Exposures to hydrodynamic shock and to cavitation (partial vacuum) pressure in the draft tube of existing turbines are among the principal causes for injuries and mortality to fish moving through the system.

Fish mortality related to hydropower generation may be a result of combination of causes including external injuries (striking on the flow obstructing elements such as wicket gates), internal injuries (passing through cavitation pressure zone), and oxygen deficiency in the water downstream. Gas bubble diseases due to supersaturation of nitrogen has also been cited as a possible cause. Turbine 10 will reduce the potential for external and internal fish injuries through reduction of elements of flow obstruction and elimination of cavitation. Fish mortality is also reduced by improvement of the water quality in the downstream channel through aeration and gas stripping. As a result of these fundamental design changes, the reduction of fish mortality can thus be expected.

From the foregoing, it is seen that this invention will achieve at least all of its stated objectives.

What is claimed is:

1. A hydrostatic turbine, comprising, a base member having a fluid inlet, an upwardly and outwardly flared-shaped fluid outlet in the base member above the fluid inlet and being positioned to allow fluid exiting the base member to exit in an upward direction, a vertical rotor shaft having lower and upper ends and a vertical elongated axes, means for supporting the rotor shaft with one end thereof adjacent the fluid outlet, a plurality of arcuate spaced blades having upper edges secured to the end of the shaft adjacent the fluid outlet, and having intermediate edges symmetrical in shape to the shape of the upwardly and outwardly flared-shape of the fluid outlet, and a flume ring symmetrical in shape to the outwardly flared shape of the fluid outlet secured to the intermediate edges of the blades and partially extending downwardly into the fluid outlet.

2. The device of claim 1 wherein said arcuate blades have an arcuate inner edge secured to said rotor shaft, and extending in a helical direction with respect to the outer surface of said shaft.

3. The device of claim 1 wherein said blades have lower edges having a radial length less than the length of said upper edges whereby a wedged-shaped space is defined between adjacent blades with the said parabolic plane defining the top of said space, and a horizontal plane passing through said lower edges defining the bottom of said space, with the area of the top of said space being greater than the area of the bottom of said space to create a progressively upwardly and outwardly divergent flow passageway from the bottom towards the top of said space.

4. The device of claim 1 wherein said blades are positioned with respect to said fluid outlet that the direction of fluid flow upwardly from said base member will be perpendicular to the parabolically shaped spherical plane defined by the upper edges of said blades.

5. The device of claim 1 wherein said arcuate blades have upper and lower edges, with the lower edge defining a leading edge blade angle, and an extension blade element is secured to said shaft adjacent the lower edges of said blades, and means on said shaft for moving said extension blade elements with respect to the lower edge of said blades to change the leading edge angle thereof.

6. The device of claim 1 wherein the base member has a hollow cylindrical compartment below the fluid inlet, a needle valve slidably mounted for vertical movement within said compartment, and adapted to be moved from a lower open position to a closed upper position above said fluid inlet, and a fluid conduit connecting said fluid inlet and said compartment at a location below said needle valve to permit the fluid pressure above and below said needle valve to be substantially equalized.

7. The device of claim 6 wherein a fluid pump is fluidly connected to a source of fluid and to said compartment at a location below said needle valve to inject fluid under pressure into said compartment and to withdraw fluid out of said compartment to raise and lower, respectively, said needle valve within said compartment to effect the closing and opening, respectively, of said fluid inlet.

\* \* \* \* \*